United States Patent
Shigemitsu (10) Patent No.: US 10,960,270 B2
(45) Date of Patent: Mar. 30, 2021

(54) GOLF BALL RESIN COMPOSITION AND GOLF BALL

(71) Applicant: Sumitomo Rubber Industries, Ltd., Kobe (JP)

(72) Inventor: Takahiro Shigemitsu, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 72 days.

(21) Appl. No.: 16/113,828

(22) Filed: Aug. 27, 2018

(65) Prior Publication Data

US 2019/0076704 A1 Mar. 14, 2019

(30) Foreign Application Priority Data

Sep. 13, 2017 (JP) .............................. JP2017-175460

(51) Int. Cl.

| | |
|---|---|
| A63B 37/00 | (2006.01) |
| A63B 37/12 | (2006.01) |
| C08L 23/08 | (2006.01) |
| C08L 77/00 | (2006.01) |
| C08L 77/06 | (2006.01) |
| C08L 9/00 | (2006.01) |
| C08L 91/06 | (2006.01) |

(52) U.S. Cl.
CPC ...... *A63B 37/0092* (2013.01); *A63B 37/0024* (2013.01); *A63B 37/0031* (2013.01); *A63B 37/0039* (2013.01); *A63B 37/0043* (2013.01); *A63B 37/0083* (2013.01); *A63B 37/0096* (2013.01); *C08L 9/00* (2013.01); *C08L 23/0876* (2013.01); *C08L 77/00* (2013.01); *C08L 77/06* (2013.01); *C08L 91/06* (2013.01); A63B 37/0074 (2013.01); A63B 37/0075 (2013.01); A63B 37/0076 (2013.01); A63B 37/0078 (2013.01); A63B 37/0087 (2013.01); C08L 2205/025 (2013.01); C08L 2205/03 (2013.01); C08L 2205/035 (2013.01)

(58) Field of Classification Search
None
See application file for complete search history.

(56) References Cited

U.S. PATENT DOCUMENTS

| | | | |
|---|---|---|---|
| 6,034,182 A | 3/2000 | Kashiwagi et al. | |
| 6,251,991 B1 * | 6/2001 | Takesue | C08L 75/04 473/378 |
| 6,268,437 B1 * | 7/2001 | Takesue | A63B 37/0003 473/365 |
| 6,329,458 B1 * | 12/2001 | Takesue | C08K 5/098 473/351 |
| 6,562,906 B2 * | 5/2003 | Chen | C08L 23/025 525/191 |
| 6,624,221 B2 * | 9/2003 | Takesue | C08L 23/08 473/351 |
| 2001/0020069 A1 | 9/2001 | Takesue et al. | |
| 2003/0149175 A1 * | 8/2003 | Feinberg | C08L 23/0876 525/70 |
| 2007/0066758 A1 * | 3/2007 | McArdle | C08L 23/0853 525/240 |
| 2012/0003459 A1 * | 1/2012 | Ishiguro | C08J 5/18 428/220 |
| 2012/0208656 A1 * | 8/2012 | Chen | A63B 37/0031 473/378 |

FOREIGN PATENT DOCUMENTS

| | | |
|---|---|---|
| JP | 9-225065 A | 9/1997 |
| JP | 11-57071 A | 3/1999 |
| JP | 2009-178602 A | 8/2009 |

OTHER PUBLICATIONS

UMEX Grades; Sanyo Chemical Industries, pp. 1-3. No date. (Year: 0000).*
UMEX Resin Modifiers; Sanyo Chemical Industries, pp. 1-3, no date (Year: 0000).*
Sanyo Chemical News, Polyolefin Resin Modifier Aug. 2016 No. 497 pp. 1-4. (Year: 2016).*

\* cited by examiner

*Primary Examiner* — David J Buttner
(74) *Attorney, Agent, or Firm* — Birch, Stewart, Kolasch & Birch, LLP (57) ABSTRACT

An object of the present invention is to provide a golf ball resin composition by which durability can be improved without substantially reducing hardness and resilience, and a golf ball using the same. The present invention provides a golf ball resin composition containing (A) at least one member selected from the group consisting of an ionomer resin, a polyamide and a styrene-based elastomer, and (B) an acid modified polyolefin having a weight average molecular weight in a range from 5,000 to 80,000.

16 Claims, 1 Drawing Sheet

GOLF BALL RESIN COMPOSITION AND GOLF BALL

FIELD OF THE INVENTION

The present invention relates to a golf ball material and a golf ball.

DESCRIPTION OF THE RELATED ART

Examples of a construction of a golf ball include a two-piece golf ball composed of a core and a cover; a three-piece golf ball composed of a core, one intermediate layer covering the core, and a cover covering the intermediate layer; and a multi-piece golf ball composed of a core, at least two intermediate layers covering the core, and a cover covering the intermediate layers. As a material constituting each layer of the golf ball, an ionomer resin is used. Since the ionomer resin exhibits high stiffness, if the ionomer resin is used for the constituent member of the golf ball, the resultant golf ball travels a great flight distance. Thus, the ionomer resin is widely used as a material for the intermediate layer or cover of the golf ball.

For example, Japanese Patent Publication No. H9-225065 A discloses a golf ball resin composition which is a melted mixture of an ionomer resin, a partially saponified product of an ethylene-unsaturated carboxylic acid ester copolymer and a polymer having a maleic acid anhydride group.

Japanese Patent Publication No. H11-57071 A discloses a golf ball cover material containing: a resin composition composed of 90 to 10 weight % of (A) an ionomer resin and 10 to 90 weight % of (B) a copolymer obtained by copolymerizing ethylene and an α-olefin having 4 or more carbon atoms, and having a specific density in a range from 0.86 to 0.92 and a value obtained by dividing the weight average molecular weight (Mw) thereof by the number average molecular weight (Mn) thereof of 2.5 or less, and (C) a polyolefin having a polar group in an amount of 0.5 to 20 parts by weight with respect to 100 parts by weight of the total amount of the component (A) and the component (B).

Japanese Patent Publication No. 2009-178602 A discloses a golf ball cover material mainly containing a heated mixture of (a) an ionomer resin, (b) a polyethylene and (d) a low molecular weight polyethylene wax.

SUMMARY OF THE INVENTION

A golf ball is required to travel a great flight distance. For example, if the hardness of a golf ball resin composition for forming the cover or intermediate layer is increased, the spin rate on driver shots is decreased and the flight distance becomes greater. In addition, if a golf ball resin composition having high hardness is used, the obtained golf ball has greater resilience. However, if the hardness of the golf ball resin composition for forming the cover or intermediate layer is increased, the durability of the golf ball is reduced. The present invention has been achieved in view of the above problems. An object of the present invention is to provide a golf ball resin composition improving durability without substantially reducing hardness and resilience, and a golf ball using the same.

The golf ball resin composition according to the present invention contains (A) at least one member selected from the group consisting of an ionomer resin, a polyamide and a styrene-based elastomer, and (B) an acid modified polyolefin having a weight average molecular weight in a range from 5,000 to 80,000.

According to the present invention, a golf ball resin composition improving durability without substantially reducing hardness and resilience can be provided. In addition, the golf ball according to the present invention has excellent resilience and durability.

DESCRIPTION OF THE PREFERRED EMBODIMENT

Figure 1:
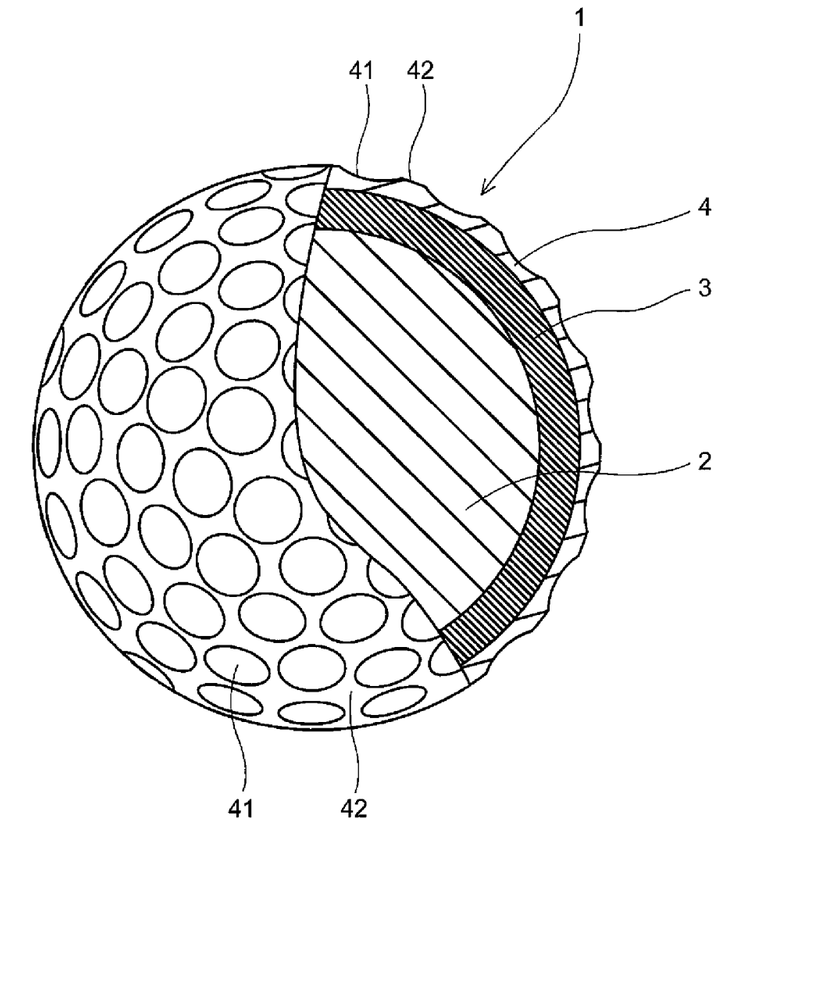
The FIGURE is a partially cutaway sectional view showing a golf ball according to an embodiment of the present invention.

The golf ball resin composition according to the present invention contains (A) at least one member selected from the group consisting of an ionomer resin, a polyamide and a styrene-based elastomer, and (B) an acid modified polyolefin having a weight average molecular weight in a range from 5,000 to 80,000.

First, (A1) the ionomer resin for the component (A) will be explained.

Examples of the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

The ionomer resin is preferably thermoplastic.

It is noted that, in the present invention, the "ionomer resin consisting of a metal ion-neutralized product of a binary copolymer composed of an olefin and an α,β-unsaturated carboxylic acid having 3 to 8 carbon atoms" is sometimes referred to as the "binary ionomer resin", and the "ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes referred to as the "ternary ionomer resin".

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester and isobutyl ester of acrylic acid, methacrylic acid, fumaric acid and maleic acid, and acrylic acid ester or methacrylic acid ester is particularly preferred.

Preferable examples of the binary ionomer resin include a metal ion-neutralized product of a binary copolymer composed of ethylene and (meth)acrylic acid, and preferable examples of the ternary ionomer resin include a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in the binary ionomer resin is preferably 15 mass % or more, more preferably 16 mass % or more, and even more preferably 17 mass % or more, and is preferably 30 mass % or less, more preferably 25 mass % or less. If the content of the α,β-unsaturated carboxylic acid component having 3 to 8 carbon atoms is 15 mass % or more, a constituent member having a desired hardness may be easily obtained. In addition, if the content of the α,β-unsaturated carboxylic acid component having 3 to 8 carbon atoms is 30 mass % or less, the hardness of the obtained constituent member does not become excessively high, and thus the obtained golf ball has better durability and shot feeling.

The degree of neutralization of the carboxyl groups in the binary ionomer resin is preferably 15 mole % or more, more preferably 20 mole % or more, and is preferably 100 mole % or less. If the degree of neutralization is 15 mole % or more, the resultant golf ball has better resilience and durability. It is noted that the degree of neutralization of the carboxyl groups in the binary ionomer resin can be calculated by the following expression. In addition, it is noted that sometimes the metal component is contained in an amount that the theoretical degree of neutralization of the carboxyl groups in the binary ionomer resin exceeds 100 mole %.

Degree of neutralization (mol %) of the binary ionomer resin=(the number of moles of carboxyl groups neutralized in the binary ionomer resin/the number of moles of all carboxyl groups contained in the binary ionomer resin)×100

Examples of the metal ion for neutralizing at least a part of carboxyl groups of the binary ionomer resin include monovalent metal ions such as sodium, potassium and lithium; divalent metals ions such as magnesium, calcium, zinc, barium and cadmium; trivalent metals ions such as aluminum; and other ions such as tin and zirconium.

Specific examples of the binary ionomer resin include products having a trade name of "Himilan (registered trademark) (e.g. Himilan1555 (Na), Himilan1557 (Zn), Himilan1605 (Na), Himilan1706 (Zn), Himilan1707 (Na), Himilan AM7311 (Mg), Himilan AM7329 (Zn)" available from Mitsui-Du Pont Polychemicals Co., Ltd.

Specific examples of the binary ionomer resin further include products having a trade name of "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E.I. du Pont de Nemours and Company.

Specific examples of the binary ionomer resin also include products having a trade name of "lotek (registered trademark) (e.g. lotek 8000 (Na), lotek 8030 (Na), lotek 7010 (Zn), lotek 7030 (Zn))" available from ExxonMobil Chemical Corporation.

The binary ionomer resin exemplified above may be used alone or as a mixture of at least two of them. It is noted that Na, Zn, Li, Mg and the like described in the parentheses after the trade names indicate metal types of neutralizing metal ions of the binary ionomer resins.

The bending stiffness of the binary ionomer resin is preferably 140 MPa or more, more preferably 150 MPa or more, and even more preferably 160 MPa or more, and is preferably 550 MPa or less, more preferably 500 MPa or less, and even more preferably 450 MPa or less. If the bending stiffness of the binary ionomer resin is excessively low, the spin rate of the golf ball may increase and thus the flight distance of the golf ball may be lowered, and if the bending stiffness of the binary ionomer resin is excessively high, the durability of the golf ball may be lowered.

The melt flow rate (190° C., 2.16 kgf) of the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the melt flow rate (190° C., 2.16 kgf) of the binary ionomer resin is 0.1 g/10 min or more, the golf ball resin composition has better fluidity, and thus, for example, a thin layer may be easily molded. In addition, if the melt flow rate (190° C., 2.16 kgf) of the binary ionomer resin is 30 g/10 min or less, the obtained golf ball has better durability.

The content of the α,β-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The degree of neutralization of the carboxyl groups in the ternary ionomer resin is preferably 20 mole % or more, more preferably 30 mole % or more, and is preferably 100 mole % or less. If the degree of neutralization is 20 mole % or more, the resultant golf ball has better resilience and durability. It is noted that the degree of neutralization of the carboxyl groups in the ternary ionomer resin can be calculated by the following expression. In addition, it is noted that sometimes the metal component is contained in an amount that the theoretical degree of neutralization of the carboxyl groups in the ternary ionomer resin exceeds 100 mole %.

Degree of neutralization (mol %) of the ternary ionomer resin=(the number of moles of carboxyl groups neutralized in the ternary ionomer resin/the number of moles of all carboxyl groups contained in the ternary ionomer resin)×100

Examples of the metal ion for neutralizing at least a part of carboxyl groups of the ternary ionomer resin include monovalent metal ions such as sodium, potassium and lithium; divalent metals ions such as magnesium, calcium, zinc, barium and cadmium; trivalent metals ions such as aluminum; and other ions such as tin and zirconium.

Specific examples of the ternary ionomer resin include products having a trade name of "Himilan (registered trademark) (e.g. Himilan AM7327 (Zn), Himilan 1855 (Zn), Himilan 1856 (Na), Himilan AM7331 (Na))" available from Mitsui-Du Pont Polychemicals Co., Ltd., products having a trade name of "Surlyn 6320 (Mg), Surlyn 8120 (Na), Surlyn 8320 (Na), Surlyn 9320 (Zn), Surlyn 9320W (Zn), HPF1000 (Mg), HPF2000 (Mg))" available from E.I. du Pont de Nemours and Company, and products having a trade name of "lotek 7510 (Zn), lotek 7520 (Zn))" available from ExxonMobil Chemical Corporation. It is noted that Na, Zn, Mg and the like described in the parentheses after the trade names indicate metal types of neutralizing metal ions of the ternary ionomer resins. The ternary ionomer resin exemplified above may be used alone or as a mixture of at least two of them.

The bending stiffness of the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the bending stiffness of the ternary ionomer resin is excessively low, the spin rate of the golf ball may increase and thus the flight distance of the golf ball may be lowered, and if the bending stiffness of the ternary ionomer resin is excessively high, the durability of the golf ball may be lowered.

The melt flow rate (190° C., 2.16 kgf) of the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the melt flow rate (190° C., 2.16 kgf) of the ternary ionomer resin is 0.1 g/10 min or more, the golf ball resin composition has better fluidity, and thus a thin layer may be easily molded. In addition, if the melt flow rate (190° C., 2.16 kgf) of the ternary ionomer resin is 20 g/10 min or less, the obtained golf ball has better durability.

The slab hardness of the ternary ionomer resin is preferably 20 or more, more preferably 25 or more, and even more preferably 30 or more, and is preferably 70 or less, more preferably 65 or less, and even more preferably 60 or less in Shore D hardness. If the slab hardness is 20 or more in Shore D hardness, the obtained constituent member does not become excessively soft, and thus the golf ball has better resilience. In addition, if the slab hardness is 70 or less in Shore D hardness, the obtained constituent member does not become excessively hard, and thus the golf ball has better durability.

(A2) The Polyamide

Next, (A2) the polyamide used as the component (A) will be explained. The polyamide is not particularly limited, as long as it is a polymer having a plurality of amide bonds (—NH—CO—) in a main molecular chain. Examples of the polyamide include a product having an amide bond formed by a ring-opening polymerization of lactam or a reaction between a diamine component and a dicarboxylic acid component.

The polyamide is preferably thermoplastic.

Examples of the polyamide include an aliphatic polyamide such as polyamide 6, polyamide 11, polyamide 12, polyamide 66, polyamide 610, polyamide 6T, polyamide 61, polyamide 9T, polyamide MST, and polyamide 612; and an aromatic polyamide such as poly-p-phenyleneterephthalamide, and poly-m-phenyleneisophthalamide. These polyamides may be used solely or at least two of them may be used in combination. Among them, the aliphatic polyamide such as polyamide 6, polyamide 66, polyamide 11, and polyamide 12 are preferable.

Specific examples of the polyamide include products having a trade name of "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, and Rilsan BMN P40 D)" available from Arkema Inc.

The polyamide used in the present invention may contain a polyamide elastomer. The polyamide elastomer has a hard segment part composed of a polyamide component and a soft segment part. Examples of the soft segment part of the polyamide elastomer include a polyetherester component and a polyether component. Examples of the polyamide elastomer include a polyetherester amide obtained by a reaction between a polyamide component (hard segment component) and a polyetherester component (soft segment component) composed of a polyoxyalkylene glycol and a dicarboxylic acid; and a polyether amide obtained by a reaction between a polyamide component (hard segment component) and a polyether component (soft segment component) composed of a polyoxyalkylene glycol with both terminals being aminated or carboxylated and a dicarboxylic acid or diamine.

Examples of the polyamide elastomer include "Pebax (registered trademark) 2533", "Pebax 3533", "Pebax 4033", and "Pebax 5533" available from Arkema Inc.

(A3) The styrene-based elastomer used as the component (A) will be explained. As the styrene-based elastomer, an elastomer including a styrene block is preferably used. The elastomer including the styrene block has a polystyrene block as a hard segment and a soft segment. Typical soft segment is a diene block. Examples of the constituent component of the diene block include butadiene, isoprene, 1,3-pentadiene and 2,3-dimethyl-1,3-butadiene. Butadiene and isoprene are preferred. Two or more of the constituent components may be used in combination.

The styrene-based elastomer is preferably thermoplastic.

Examples of the elastomer including the styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS, and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the elastomer including the styrene block is preferably 10 mass % or more, more preferably 12 mass % or more, and even more preferably 15 mass % or more. In view of the shot feeling of the obtained golf ball, the above amount is preferably 50 mass % or less, more preferably 47 mass % or less, and even more preferably 45 mass % or less.

Examples of the elastomer including the styrene block include SBS, SIS, SIBS, SEBS, SEPS, SEEPS, and an alloy of a polyolefin with one or at least two members selected from the group consisting of the above hydrogenated products. It is estimated that the olefin component in the alloy contributes to improving the compatibility with the ionomer resin. If the alloy is used, the golf ball has enhanced resilience performance. An olefin having 2 to 10 carbon atoms is preferably used. Preferable examples of the olefin include ethylene, propylene, butene and pentene. Ethylene and propylene are most preferred.

Specific examples of the polymer alloy include "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N" and "Rabalon SR04" available from Mitsubishi Chemical Corporation. Other specific examples of the thermoplastic elastomer including the styrene block include "EPOFRIEND A1010" available from Daicel Corporation.

The golf ball resin composition according to the present invention contains at least one member selected from the group consisting of (A1) the ionomer resin, (A2) the polyamide and (A3) the styrene-based elastomer as the component (A). Specific examples of the golf ball resin composition according to the present invention include an embodiment containing any one of (A1) the ionomer resin, (A2) the polyamide and (A3) the styrene-based elastomer as the component (A); an embodiment containing (A1) the ionomer resin and (A2) the polyamide as the component (A); an embodiment containing (A1) the ionomer resin and (A3) the styrene-based elastomer as the component (A); an embodiment containing (A2) the polyamide and (A3) the styrene-based elastomer as the component (A); and an embodiment containing (A1) the ionomer resin, (A2) the polyamide and (A3) the styrene-based elastomer as the component (A).

In the embodiment containing (A1) the ionomer resin and (A2) the polyamide as the component (A), the mass ratio ((A1)/(A2)) of (A1) the ionomer resin to (A2) the polyamide is preferably 1/99 or more, more preferably 2/98 or more, even more preferably 5/95 or more, and most preferably 60/40 or more, and is preferably 95/5 or less, more preferably 90/10 or less, and even more preferably 80/20 or less. If the mass ratio of the component (A1) to the component (A2) falls within the above range, the obtained golf ball has better resilience and durability.

Next, (B) the acid modified polyolefin used in the present invention will be explained. The acid modified polyolefin is a polyolefin having an acid group introduced into a polyolefin backbone.

The acid modified polyolefin is not particularly limited, as long as it is a compound synthesized by using one or at least two olefins as a monomer. The olefin constituting the acid modified polyolefin is preferably an olefin having 2 to 8 carbon atoms. Examples of the olefin include ethylene, propylene, butene, pentene, hexene, heptene and octane. The polyolefin is preferably a compound having polyethylene or polypropylene as the main backbone, more preferably a compound having polypropylene as the main backbone.

The acid modified polyolefin preferably has a structure represented by the following formula (I).

In the formula (I), R is a hydrocarbon group having 1 or more carbon atoms. R is preferably a hydrocarbon group having 1 or more carbon atoms, more preferably a hydrocarbon group having 2 or more carbon atoms, and is preferably a hydrocarbon group having 10 or less carbon atoms, more preferably a hydrocarbon group having 7 or less carbon atoms, and even more preferably a hydrocarbon group having 5 or less carbon atoms. In the formula (I), n is an integer of 1 or more.

The hydrocarbon group is preferably an alkylene group. Examples of the alkylene group include methylene group, ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group.

In addition, R may have a linear structure or a branched structure, and preferably has a branched structure. As R, for example, a methylmethylene group is suitable.

Examples of the acid group of the acid modified polyolefin include a carboxy group, a phosphoric acid group, and a sulfonic acid group. Examples of the method of introducing the acid group into the polyolefin backbone include a method of copolymerizing an olefin and a monomer having an acid group, and a method of graft polymerizing a monomer having an acid group to the polyolefin backbone.

Examples of the monomer having the carboxy group include an α,β-unsaturated carboxylic acid such as acrylic acid, methacrylic acid, fumaric acid, maleic acid and crotonic acid; and a monomer obtained by a reaction between a hydroxyalkyl (meth)acrylate and a polybasic acid such as succinic acid, maleic acid, phthalic acid, 1,2-cyclohexane dicarboxylic acid, trimellitic acid and pyromellitic acid, or an acid halide or acid anhydride thereof.

Examples of the monomer having the phosphoric acid group include 2-(methacryloyloxy)ethyl phosphate, 3-chloro-2-(phosphonooxy)propyl methacrylate, 2-(methacryloyloxy)propyl phosphate, 2-(phenoxyphosphonyloxy) ethyl methacrylate, acid phosphooxypolyoxyethylene glycol monomethacrylate, and acid phosphooxypolyoxypropylene glycol monomethacrylate.

Examples of the monomer having the sulfonic acid group include at least one member selected from the group consisting of (meth)allyl sulfonic acid, vinyl sulfonic acid, styrene sulfonic acid, (meth)acrylic amide alkylsulfonic acid, allyloxyhydroxypropane sulfonic acid, and their salts. Specific examples thereof include styrene sulfonic acid, vinyl sulfonic acid, allyl sulfonic acid, (meth)allyl sulfonic acid, 2-(meth)acryloyloxyethyl sulfonic acid, 2-acrylic amide-2-methylpropane sulfonic acid, 3-(meth)acryloyloxypropyl sulfonic acid, 2-(meth)acryloyloxypropyl sulfonic acid, 3-(meth)acryloyloxy-2-hydroxypropyl sulfonic acid, 2-(meth)acryloyloxybutyl sulfonic acid, and their alkali metal salts, alkaline earth metal salts, and ammonium salts.

In the present invention, as the acid modified polyolefin, the carboxylic acid anhydride modified polyolefin is preferably used, the maleic acid anhydride modified polyolefin is more preferably used, and the maleic acid anhydride modified polyethylene and/or the maleic acid anhydride modified polypropylene is even more preferably used.

The weight average molecular weight of the acid modified polyolefin is, for example, preferably 5,000 or more, more preferably 6,000 or more, and even more preferably 7,000 or more, and is preferably 80,000 or less, more preferably 75,000 or less, and even more preferably 70,000 or less. If the weight average molecular weight of the acid modified polyolefin falls within the above range, the durability of the golf ball is enhanced without lowering the resilience of the golf ball.

The acid value of the acid modified polyolefin is preferably 0.5 mgKOH/g or more, more preferably 1.0 mgKOH/g or more, and even more preferably 2.0 mgKOH/g or more, and is preferably 200 mgKOH/g or less, more preferably 175 mgKOH/g or less, and even more preferably 150 mgKOH/g or less. If the acid value falls within the above range, the acid modified polyolefin has better compatibility with the base polymer, and thus the dispersibility thereof becomes better.

The melt viscosity (mPa·s, 160° C. to 180° C.) of the acid modified polyolefin is preferably 50 or more, more preferably 75 or more, and even more preferably 100 or more, and is preferably 30,000 or less, more preferably 25,000 or less, and even more preferably 20,000 or less. If the melt viscosity falls within the above range, the acid modified polyolefin has better compatibility with the base polymer, and thus the dispersibility thereof becomes better.

The amount of (B) the acid modified polyolefin in the golf ball resin composition is preferably 0.1 part by mass or more, more preferably 0.2 part by mass or more, and even more preferably 0.5 part by mass or more, and is preferably 10 parts by mass or less, more preferably 9 parts by mass or less, and even more preferably 8 parts by mass or less, with respect to 100 parts by mass of the component (A). If the amount of (B) the acid modified polyolefin falls within the above range, lowering in the resilience of the golf ball is suppressed, and the durability of the golf ball is enhanced.

The golf ball resin composition according to the present invention may further contain another resin component than the component (A) and the component (B) as the resin component. In this case, the total amount of the component (A) and the component (B) is preferably 50 mass % or more, more preferably 60 mass % or more, and even more preferably 70 mass % or more. It is also preferred that the resin component of the golf ball resin composition according to the present invention consists of the component (A) and the component (B).

The slab hardness of the golf ball resin composition according to the present invention is preferably 20 or more, more preferably 25 or more, and even more preferably 30 or more, and is preferably 90 or less, more preferably 85 or less in Shore D hardness. If the slab hardness of the golf ball resin composition is 20 or more in Shore D hardness, the obtained constituent member is not excessively soft, and thus the golf ball has better resilience. In addition, if the slab hardness of the golf ball resin composition is 90 or less in Shore D hardness, the obtained constituent member is not excessively hard, and thus the golf ball has better shot feeling.

The golf ball resin composition according to the present invention may further include additives, for example, a pigment component such as a white pigment (e.g. titanium oxide) and a blue pigment, a weight adjusting agent, a dispersant, an antioxidant, an ultraviolet absorber, a light stabilizer, and a fluorescent material or fluorescent brightener. Examples of the weight adjusting agent include an inorganic filler such as zinc oxide, barium sulfate, calcium carbonate, magnesium oxide, tungsten powder, and molybdenum powder.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the component (A). If the amount of the white pigment is 0.5 part by mass or more, it is possible to impart the opacity to the obtained golf ball constituent member, and if the amount of the white pigment is more than 10 parts by mass, the durability of the obtained golf ball constituent member may deteriorate.

The golf ball resin composition according to the present invention may be obtained, for example, by dry blending the component (A), the component (B), and where necessary, other additives or the like. Further, the dry blended mixture may be extruded into a pellet form. The dry blending is preferably carried out by using for example, a mixer capable of blending raw materials in a pellet form, more preferably carried out by using a tumbler type mixer. The extrusion may be carried out by using a publicly known extruder such as a single-screw extruder, a twin-screw extruder, and a twin-single screw extruder.

The golf ball according to the present invention is not particularly limited, as long as it is a golf ball comprising a constituent member formed from the golf ball resin composition according to the present invention. Examples of the golf ball include a two-piece golf ball composed of a single layered core and a cover disposed around the core; a three-piece golf ball composed of a core, a single layered intermediate layer disposed around the core, and a cover disposed around the intermediate layer; and a multi-piece golf ball (including the three-piece golf ball) composed of a core, one or more intermediate layers disposed around the core, and a cover disposed around the intermediate layers. Any one of the constituent members of these golf balls may be formed from the above mentioned golf ball resin composition. Among them, the embodiment which is a two-piece golf ball composed of a single layered core and a cover disposed around the core, wherein the cover is formed from the golf ball resin composition according to the present invention; and the embodiment which is a multi-piece golf ball composed of a core, one or more intermediate layers disposed around the core and a cover disposed around the one or more intermediate layers, wherein at least one layer of the intermediate layers is formed from the golf ball resin composition according to the present invention, are preferable.

Next, the golf ball according to the present invention will be explained in detail, with reference to the preferable embodiment which is a golf ball (including a three-piece golf ball) comprising a core, one or more intermediate layer disposed around the core, and a cover disposed around the intermediate layer, and in which at least one of the intermediate layers is formed from the golf ball resin composition according to the present invention. It is noted that the golf ball according to the present invention is not limited to this embodiment.

In the preferable embodiment, the core of the golf ball according to the present invention may be a single-layered core or a multi-layered core.

The core may be formed from a conventional rubber composition (hereinafter, sometimes simply referred to as "core rubber composition"). For example, the core may be formed by heat pressing a rubber composition containing a base rubber, a crosslinking initiator, a co-crosslinking agent and a filler.

As the base rubber, a natural rubber and/or a synthetic rubber may be used. Examples of the base rubber include a polybutadiene rubber, a natural rubber, a polyisoprene rubber, a styrene polybutadiene rubber, and an ethylene-propylene-diene rubber (EPDM). These base rubbers may be used solely or as a mixture of at least two of them. Among them, particularly preferred is a high cis-polybutadiene having a cis-1,4-bond which is beneficial to the resilience in a content of 40 mass % or more, preferably 80 mass % or more and more preferably 90 mass % or more.

The crosslinking initiator is blended to crosslink the base rubber component. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. These organic peroxides may be used solely or as a mixture of at least two of them. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber. If the amount of the crosslinking initiator is less than 0.2 part by mass, the core becomes so soft that the resilience of the golf ball tends to be lowered, and if the amount of the crosslinking initiator is more than 3 parts by mass, the amount of the co-crosslinking agent must be decreased to obtain an appropriate hardness, which tends to cause insufficient resilience or poor durability of the golf ball.

The co-crosslinking agent is not particularly limited, as long as it has an action of crosslinking rubber molecules by graft polymerization to a molecular chain of the base rubber. As the co-crosslinking agent, for example, an $\alpha,\beta$-unsaturated carboxylic acid having 3 to 8 carbon atoms or a metal salt thereof may be used. Preferable examples of the co-crosslinking agent include acrylic acid, methacrylic acid and metal salts thereof. Examples of the metal constituting the metal salt include zinc, magnesium, calcium, aluminum and sodium. Among them, the zinc salt is preferably used because the zinc salt provides high resilience to the obtained golf ball. The amount of the co-crosslinking agent is preferably 10 parts by mass or more, more preferably 20 parts by mass or more, and is preferably 50 parts by mass or less, more preferably 40 parts by mass or less, with respect to 100 parts by mass of the base rubber. If the amount of the co-crosslinking agent is less than 10 parts by mass, the amount of the crosslinking initiator must be increased to obtain an appropriate hardness, which tends to lower the resilience. On the other hand, if the amount of the co-crosslinking agent is more than 50 parts by mass, the core becomes so hard that the shot feeling may be lowered.

The core rubber composition may further contain an organic sulfur compound. As the organic sulfur compound, diphenyl disulfides (e.g. diphenyl disulfide, bis(pentabromophenyl) persulfide), thiophenols or thionaphthols (e.g. 2-thionaphthol) may be suitably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber.

The core rubber composition may further contain a carboxylic acid and/or a metal salt thereof. The carboxylic acid and/or the metal salt thereof is preferably a carboxylic acid having 1 to 30 carbon atoms and/or a salt thereof. The carboxylic acid may be any one of an aliphatic carboxylic acid (fatty acid) and an aromatic carboxylic acid (such as benzoic acid). The fatty acid may be either a saturated fatty acid or an unsaturated fatty acid, but a saturated fatty acid is preferable. Examples of the saturated fatty acid include caprylic acid (octanoic acid), pelargonic acid (nonanoic acid), capric acid (decanoic acid), lauric acid, myristic acid, palmitic acid, stearic acid, and behenic acid. As the metal of the metal salt, zinc, magnesium, calcium, aluminum and sodium are preferable, zinc is more preferable. It is noted that the fatty acid and/or the metal salt thereof excludes the $\alpha,\beta$-unsaturated carboxylic acid having 3 to 8 carbon atoms and/or the metal salt thereof used as the co-crosslinking agent.

The amount of the fatty acid and/or the metal salt thereof is 1 part by mass or more and 40 parts by mass or less with respect to 100 parts by mass of the base rubber. It is noted that sometimes the surface of zinc acrylate used as the co-crosslinking agent is treated with stearic acid or zinc stearate for improving the dispersibility of zinc acrylate in the rubber. When the zinc acrylate having the surface treated with stearic acid or zinc stearate is used, the amount of stearic acid or zinc stearate used as the surface treating agent is also included in the amount of the fatty acid and/or the metal salt thereof.

The core rubber composition may further contain additives such as a pigment, a filler for adjusting weight, an antioxidant, a peptizing agent and a softener, where necessary.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. The particularly preferred filler is zinc oxide. It is considered that zinc oxide functions as a vulcanizing adjuvant, and enhances the hardness of the whole core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of the base rubber. If the amount of the filler is less than 0.5 part by mass, it is difficult to adjust the weight, and if the amount of the filler is more than 30 parts by mass, the weight fraction of the rubber component is reduced and thus the resilience tends to be lowered.

The amount of the antioxidant is preferably 0.1 part by mass or more and 1 part by mass or less with respect to 100 parts by mass of the base rubber. In addition, the amount of the peptizing agent is preferably 0.1 part by mass or more and 5 parts by mass or less with respect to 100 parts by mass of the base rubber.

The molding conditions for heat pressing the core rubber composition may be appropriately set according to the formulation of the rubber composition, but generally it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

The core of the golf ball according to the present invention preferably has a spherical shape. If the shape of the core is not spherical, the thickness of the intermediate layer or cover becomes uneven. As a result, the performance of the intermediate layer or cover may partially deteriorate.

The core of the golf ball according to the present invention preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the core has a diameter of 34.8 mm or more, the thickness of the cover does not become too thick and thus the resilience becomes better. On the other hand, if the core has a diameter of 42.2 mm or less, the thickness of the cover does not become too thin and thus the cover functions better.

When the core has a diameter in a range from 34.8 mm to 42.2 mm, the compression deformation amount of the core (shrinking amount of the core along the compression direction) when applying a load from 98 N as an initial load to 1275 N as a final load to the core is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better, and if the compression deformation amount is 6.0 mm or less, the resilience of the golf ball becomes better.

Examples of the method for forming the intermediate layer include, but are not limited to, a method which comprises molding the intermediate layer composition into hemispherical half shells in advance, covering the spherical body with two of the hemispherical half shells, and performing the compression molding, and a method which comprises injection molding the intermediate layer composition directly onto the spherical body to cover the spherical body.

In case of injection molding the golf ball resin composition according to the present invention onto the spherical body to form the intermediate layer, it is preferred to use upper and lower molds, each having a hemispherical cavity. When molding the intermediate layer by the injection molding method, the hold pin is protruded to hold the spherical body, and the golf ball resin composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the golf ball resin composition into the half shell according to the present invention may be carried out, for example, under a pressure of 1 MPa or more and 20 MPa or less at a temperature of −20° C. or more and +70° C. or less relative to the flow beginning temperature of the golf ball resin composition. If the molding is carried out under the above conditions, the half shell having a uniform thickness can be formed. Examples of the method for molding the intermediate layer by using the half shell include a method of covering the spherical body with two of the half shells and performing the compression molding. Compression molding the half shells into the intermediate layer may be carried out, for example, under a pressure of 0.5 MPa or more and 25 MPa or less at a temperature of −20° C. or more and +70° C. or less relative to the flow beginning temperature of the golf ball resin composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the golf ball material may be measured using the thermoplastic resin composition in a pellet form under the following conditions with "Flow Tester CFT-500" available from Shimadzu Corporation.

Measuring conditions: Plunger area: 1 cm$^2$, Die length: 1 mm, Die diameter: 1 mm, Load: 588.399 N, Starting temperature: 30° C., and Temperature increase rate: 3° C./min.

The thickness of the intermediate layer of the golf ball according to the present invention is preferably 0.3 mm or more, more preferably 0.4 mm or more, and even more preferably 0.5 mm or more, and is preferably 2.5 mm or less, more preferably 2.4 mm or less, and even more preferably 2.3 mm or less. In case of a plurality of intermediate layers, it is preferred that the total thickness of a plurality of intermediate layers falls within the above range.

The slab hardness of the intermediate layer of the golf ball according to the present invention is preferably 30 or more, more preferably 35 or more, and even more preferably 40 or more, and is preferably 90 or less, more preferably 85 or less, and even more preferably 80 or less in Shore D hardness. If the slab hardness of the intermediate layer is 30 or more Shore D hardness, the intermediate layer contributes to enhancing the degree of the outer-hard inner-soft structure of the golf ball, thereby achieving a greater flight distance due to a higher launch angle and a lower spin rate. On the other hand, if the slab hardness of the intermediate layer is 90 or less in Shore D hardness, the shot feeling is better. Here, the slab hardness of the intermediate layer is a hardness of the intermediate layer composition that is molded into a sheet form, and is measured by a method described later.

Next, the cover used in the golf ball according to the present invention will be explained. The cover of the golf ball according to the present invention may be obtained by using a cover composition by the same method as the above mentioned method for molding the intermediate layer.

Examples of the resin component contained in the cover composition include an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation. As the cover composition, for example, the thermoplastic polyurethane elastomer is preferably used. This is because the obtained golf ball has a high spin rate on approach shots.

The cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, and a fluorescent material or fluorescent brightener, in addition to the above resin component, as long as these additives do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover, and if the amount of the white pigment is more than 10 parts by mass, the durability of the obtained cover may deteriorate.

It is preferred that the slab hardness of the cover composition is suitably set in accordance with the desired performance of the golf ball. For example, in case of a so-called distance golf ball focusing on flight distance, the slab hardness of the cover composition is preferably 50 or more, more preferably 55 or more, and is preferably 80 or less, more preferably 70 or less in shore D hardness. If the slab hardness of the cover composition is 50 or more, the obtained golf ball travels a greater flight distance due to the high launch angle and the low spin rate on driver shots and iron shots. In addition, if the slab hardness of the cover composition is 80 or less, the obtained golf ball has better durability. Further, in case of a so-called spin golf ball focusing on controllability, the slab hardness of the cover composition is preferably less than 50, and is preferably 20 or more, more preferably 25 or more in Shore D hardness. If the slab hardness of the cover composition is less than 50, the spin rate on approach shots becomes greater. In addition, if the slab hardness of the cover composition is 20 or more, the abrasion resistance is enhanced.

The thickness of the cover is preferably 4.0 mm or less, more preferably 3.0 mm or less, and even more preferably 2.0 mm or less. If the thickness of the cover is 4.0 mm or less, the resultant golf ball has better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate.

The concave portions called "dimple" are usually formed on the surface of the cover when molding the cover. The total number of the dimples is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

The golf ball body having the cover formed thereon is ejected from the mold, and is preferably subjected to surface treatments such as deburring, cleaning and sandblast where necessary. In addition, if desired, a paint film or a mark may be formed thereon. The paint film preferably has a thickness of, but not limited to, 5 μm or more, more preferably 7 μm or more, and preferably has a thickness of 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball according to the present invention preferably has a diameter in range from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes greater.

The FIGURE is a partially cutaway sectional view of a golf ball 1 according to an embodiment of the present invention. The golf ball 1 comprises a spherical core 2, an intermediate layer 3 covering the spherical core 2, and a cover 4 covering the intermediate layer 3. A plurality of dimples 41 are formed on the surface of the cover 4. Other portions than the dimples 41 on the surface of the golf ball are land 42. The intermediate layer 3 is formed from the golf ball resin composition according to the present invention.

The embodiment where the golf ball resin composition according to the present invention is used for the intermediate layer has been described as above. However, the golf ball resin composition according to the present invention can be also used for the cover composition.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Weight Average Molecular Weight of Acid Modified Polyolefin The measurement was performed based on the following GPC.

<GPC Measuring Conditions>
[1] Apparatus: Waters 150-CV available from Waters Corporation
[2] Column: PLgel 10. MIXED-B available from Polymer Laboratories Corporation
[3] Eluent: o-dichlorobenzene
[4] Standard substance: polystyrene
[5] Injection conditions: sample concentration of 3 mg/ml, column temperature of 135° C.

(2) Core Hardness (Shore D Hardness)

The hardness measured at the surface of the core was adopted as the surface hardness of the core. In addition, the core was cut into two hemispheres and the hardness at the central point of the obtained cut plane was measured. It is noted that the hardness at four points of the surface of the core was measured, and the average value thereof was adopted as the surface hardness. The hardness was measured with an automatic hardness tester (Digitest II available from Bareiss company) using a detector of "Shore D".

(3) Slab Hardness (Shore D Hardness)

Sheets with a thickness of about 2 mm were produced by injection molding the golf ball resin composition (the intermediate layer composition or the cover composition). The sheets were stored at 23° C. for two weeks. At least three of these sheets were stacked on one another so as not to be affected by the measuring substrate on which the sheets were placed, and the hardness of the stack was measured with an automatic hardness tester (Digitest II available from Bareiss company) using a detector of "Shore D".

(4) Compression Deformation Amount (Mm)

The deformation amount of the core or the golf ball along the compression direction (shrinking amount of the core or the golf ball along the compression direction), when applying a load from 98 N as an initial load to 1275 N as a final load to the core or the golf ball, was measured.

(5) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, the coefficient of restitution of each golf ball was calculated. The measurement was conducted by using twelve samples for each golf ball, and the average value thereof was adopted as the coefficient of restitution of the golf ball. It is noted that the coefficient of restitution of the golf ball No. 1 is defined as an index of 100, and the coefficient of restitution of the golf balls No. 2 to No. 12 is a value represented by converting the coefficient of restitution of each golf ball into this index; and that the coefficient of restitution of the golf ball No. 13 is defined as an index of 100, and the coefficient of restitution of the golf balls No. 14 to No. 26 is a value represented by converting the coefficient of restitution of each golf ball into this index.

(6) Durability

An air gun was used to allow twelve samples for each golf ball one by one to collide with a metal plate at a speed of 45 m/sec, and the collision was repeated until the golf ball was broken. The repeated times were calculated. It is noted that the durability of the golf ball No. 1 is defined as an index of 100, and the durability of the golf balls No. 2 to No. 12 is a value represented by converting the durability of each golf ball into this index; and that the durability of the golf ball No. 13 is defined as an index of 100, and the durability of the golf balls No. 14 to No. 26 is a value represented by converting the durability of each golf ball into this index.

[Production of Two-Piece Golf Balls No. 1 to No. 12]
(1) Production of Cores

The core rubber composition No. A having the formulation shown in Table 1 was kneaded with a kneading roll, and heat pressed in upper and lower molds, each having a hemispherical cavity, at 170° C. for 20 minutes to obtain a spherical core having a diameter of 39.8 mm.

TABLE 1

| Core rubber composition No. | | A | B |
|---|---|---|---|
| Formulation (parts by mass) | Polybutadiene rubber | 100 | 100 |
| | Zinc acrylate | 30 | 38 |
| | Zinc oxide | 5 | 5 |
| | Barium sulfate | Appropriate amount* | Appropriate amount* |
| | Diphenyl disulfide | 0.5 | 0.5 |
| | Dicumyl peroxide | 0.8 | 0.8 |

TABLE 1-continued

| Core rubber composition No. | | A | B |
|---|---|---|---|
| Core properties | Diameter (mm) | 39.8 | 39.7 |
| | Surface hardness (Shore D) | 53 | 56 |
| | Center hardness (Shore D) | 37 | 38 |
| | Compression deformation amount (mm) | 3.5 | 2.7 |

*The amount of barium sulfate was adjusted such that the golf balls have a mass of 45.3 g.
Polybutadiene rubber: "BR730 (high cis polybutadiene)" available from JSR Corporation
Zinc acrylate: "ZN-DA90S" available from Nisshoku Techno Fine Chemical Co., Ltd.
Zinc oxide: Ginrei R" available from Toho Zinc Co., Ltd.
Barium sulfate: "Barium Sulfate BD" available from Sakai Chemical Industry Co., Ltd.
Dicumyl peroxide: "Percumyl (registered trademark) D" available from NOF Corporation
Diphenyl disulfide: available from Sumitomo Seika Chemicals Co., Ltd.

(2) Production of Covers

According to the formulations shown in Table 2, the materials were mixed with a twin-screw kneading extruder to prepare the cover compositions in a pellet form. The extruding conditions were a screw diameter of 45 mm, a screw rotational speed of 200 rpm, and a screw L/D=35, and the mixture was heated to 160° C. to 230° C. at the die position of the extruder. The cover composition was injection molded on the spherical core to form the cover (thickness: 1.5 mm) covering the core. The cover composition was heated to 200° C. to 260° C. at the cylinder portion of the injection apparatus, injected into a mold held under a pressure of 15 MPa, and cooled for 30 seconds, and the mold was opened to eject the golf ball having the cover formed thereon.

TABLE 2

| | | Golf ball No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Core composition No. | | A | A | A | A | A | A | A | A | A | A | A | A |
| Cover composition (parts by mass) | Surlyn 9150 | 50 | 50 | 50 | 50 | 50 | 50 | 50 | 50 | 50 | 50 | 50 | 50 |
| | Surlyn 8150 | 50 | 50 | 50 | 50 | 50 | 50 | 50 | 50 | 50 | 50 | 50 | 50 |
| | Hi-WAX 1105A | — | 2 | 5 | — | — | — | — | — | — | — | — | — |
| | Hi-WAX NP0555A | — | — | — | 2 | 5 | — | — | — | — | — | — | — |
| | UMEX 100TS | — | — | — | — | — | 2 | 5 | — | — | — | — | — |
| | UMEX 5500 | — | — | — | — | — | — | — | 2 | 5 | — | — | — |
| | UMEX 1001 | — | — | — | — | — | — | — | — | — | — | — | — |
| | UMEX 1010 | — | — | — | — | — | — | — | — | — | 2 | 5 | — |
| | Elastollan XNY80A | — | — | — | — | — | — | — | — | — | — | — | 5 |
| Weight average molecular weight of acid modified polyolefin | | — | 1930 | 1930 | 30000 | 30000 | 9000 | 9000 | 52000 | 52000 | 32000 | 32000 | — |
| Slab hardness of cover composition (Shore D) | | 67 | 66 | 66 | 68 | 68 | 68 | 68 | 68 | 68 | 68 | 67 | 66 |
| Golf ball | Compression deformation amount (mm) | 3.11 | 3.15 | 3.15 | 3.14 | 3.14 | 3.19 | 3.19 | 3.17 | 3.19 | 3.20 | 3.17 | 3.23 |
| | Coefficient of restitution | 100.0 | 99.9 | 99.8 | 99.9 | 99.9 | 100.0 | 99.8 | 100.2 | 100.0 | 100.2 | 100.0 | 99.5 |
| | Durability | 100 | 116 | 118 | 123 | 127 | 117 | 135 | 128 | 121 | 133 | 126 | 57 |

Surlyn 8150: sodium ion-neutralized ethylene-methacrylic acid copolymer ionomer resin (acid content: at least 16 mass %) available from E.I. du Pont de Nemours and Company
Surlyn 9150: zinc ion-neutralized ethylene-methacrylic acid copolymer ionomer resin (acid content: at least 16 mass %) available from E.I. du Pont de Nemours and Company
Hi-WAX 1105A: maleic acid anhydride modified polyethylene (acid value: 60 mgKOH/g, melt viscosity: 150 mPa · s (140° C.))
Hi-WAX NP0555A: maleic acid anhydride modified polypropylene (acid value: 45 mgKOH/g, melt viscosity: 500 mPa · s (180° C.))
UMEX 100TS: carboxylic acid anhydride modified polypropylene (acid value: 3.5 mgKOH/g, melt viscosity: 120 mPa · s (160° C.))
UMEX 5500: carboxylic acid anhydride modified polypropylene (acid value: 17 mgKOH/g, melt viscosity: 6200 mPa · s (160° C.))
UMEX 1001: carboxylic acid anhydride modified polypropylene (acid value: 26 mgKOH/g, melt viscosity: 15000 mPa · s (160° C.))
UMEX 1010: carboxylic acid anhydride modified polypropylene (acid value: 52 mgKOH/g, melt viscosity: 6000 mPa · s (160° C.))
Elastollan XNY80A: thermoplastic polyurethane elastomer (Shore A hardness: 80) available from BASF Japan Ltd.

[(2) Production of Three-Piece Golf Balls No. 13 to No. 26]

(1) Production of Cores

The core rubber composition No. B having the formulation shown in Table 1 was kneaded with a kneading roll, and heat pressed in upper and lower molds, each having a hemispherical cavity, at 170° C. for 20 minutes to obtain a spherical core having a diameter of 39.7 mm.

(2) Preparation of Intermediate Layer Compositions and Cover Compositions

According to the formulations shown in Table 3, the materials were mixed with a twin-screw kneading extruder to prepare the intermediate layer compositions in a pellet form. The extruding conditions were a screw diameter of 45 mm, a screw rotational speed of 200 rpm, and a screw L/D=35, and the mixture was heated to 160° C. to 230° C. at the die position of the extruder.

TABLE 3

| | | Golf ball No. | | | | | | |
|---|---|---|---|---|---|---|---|---|
| | | 13 | 14 | 15 | 16 | 17 | 18 | 19 |
| | Core composition No. | B | B | B | B | B | B | B |
| Intermediate layer composition (parts by mass) | Polyamide 610 | 35 | 35 | 35 | 35 | 35 | 35 | 35 |
| | Surlyn 9150 | 32.5 | 32.5 | 32.5 | 32.5 | 32.5 | 32.5 | 32.5 |
| | Surlyn 8150 | 32.5 | 32.5 | 32.5 | 32.5 | 32.5 | 32.5 | 32.5 |
| | Hi-WAX 1105A | — | 1.3 | 3.3 | — | — | — | — |
| | Hi-WAX NP0555A | — | — | — | 1.3 | 3.3 | — | — |
| | UMEX 100TS | — | — | — | — | — | 1.3 | 3.3 |
| | UMEX 5500 | — | — | — | — | — | — | — |
| | UMEX 1001 | — | — | — | — | — | — | — |
| | UMEX 1010 | — | — | — | — | — | — | — |
| | Elastollan XNY80A | — | — | — | — | — | — | — |
| Weight average molecular weight of acid modified polyolefin | | — | 1930 | 1930 | 30000 | 30000 | 9000 | 9000 |
| Slab hardness of intermediate layer composition (Shore D) | | 71 | 69 | 69 | 70 | 70 | 70 | 70 |
| Cover composition (Parts by mass) | Elastollan XNY82A | 100 | 100 | 100 | 100 | 100 | 100 | 100 |
| | Titanium oxide | 4 | 4 | 4 | 4 | 4 | 4 | 4 |
| Slab hardness of cover composition (Shore D) | | 29 | 29 | 29 | 29 | 29 | 29 | 29 |
| Golf ball | Compression deformation amount (mm) | 2.27 | 2.33 | 2.32 | 2.30 | 2.29 | 2.29 | 2.28 |
| | Coefficient of restitution | 100.0 | 99.4 | 99.5 | 99.9 | 99.8 | 99.8 | 99.9 |
| | Durability | 100 | 132 | 135 | 136 | 140 | 160 | 155 |

| | | Golf ball No. | | | | | | |
|---|---|---|---|---|---|---|---|---|
| | | 20 | 21 | 22 | 23 | 24 | 25 | 26 |
| | Core composition No. | B | B | B | B | B | B | B |
| Intermediate layer composition (parts by mass) | Polyamide 610 | 35 | 35 | 35 | 35 | 35 | 35 | 35 |
| | Surlyn 9150 | 32.5 | 32.5 | 32.5 | 32.5 | 32.5 | 32.5 | 32.5 |
| | Surlyn 8150 | 32.5 | 32.5 | 32.5 | 32.5 | 32.5 | 32.5 | 32.5 |
| | Hi-WAX 1105A | — | — | — | — | — | — | — |
| | Hi-WAX NP0555A | — | — | — | — | — | — | — |
| | UMEX 100TS | — | — | — | — | — | — | — |
| | UMEX 5500 | 1.3 | 3.3 | — | — | — | — | — |
| | UMEX 1001 | — | — | 1.3 | 3.3 | — | — | — |
| | UMEX 1010 | — | — | — | — | 1.3 | 3.3 | — |
| | Elastollan XNY80A | — | — | — | — | — | — | 3.3 |
| Weight average molecular weight of acid modified polyolefin | | 52000 | 52000 | 45000 | 45000 | 32000 | 32000 | — |
| Slab hardness of intermediate layer composition (Shore D) | | 70 | 70 | 70 | 70 | 70 | 70 | 68 |
| Cover composition (Parts by mass) | Elastollan XNY82A | 100 | 100 | 100 | 100 | 100 | 100 | 100 |
| | Titanium oxide | 4 | 4 | 4 | 4 | 4 | 4 | 4 |
| Slab hardness of cover composition (Shore D) | | 29 | 29 | 29 | 29 | 29 | 29 | 29 |
| Golf ball | Compression deformation amount (mm) | | 2.28 | 2.28 | 2.28 | 2.31 | 2.29 | 2.34 |
| | Coefficient of restitution | | 100.0 | 99.9 | 100.0 | 99.7 | 99.8 | 99.3 |
| | Durability | | 140 | 164 | 167 | 161 | 169 | 49 |

Polyamide 610: Amilan CM2001 available from Toray Industries, Inc.

(3) Production of Intermediate Layers

The intermediate layer (thickness: 1.0 mm) covering the core was formed by injection molding the intermediate layer composition on the spherical core. The intermediate layer composition was heated to 200° C. to 260° C. at the cylinder portion of the injection apparatus, injected into a mold held under a pressure of 15 MPa, and cooled for 30 seconds, and the mold was opened to eject the spherical body having the intermediate layer formed thereon.

(4) Production of Covers

Into 100 parts by mass of a thermoplastic polyurethane elastomer (Elastollan XNY82A available from BASF Japan Ltd.), 4 parts by mass of titanium oxide (A220 available from Ishihara Sangyo Kaisha, Ltd.) was added, and mixed with a twin-screw kneading extruder to prepare the cover composition in a pellet form. The extruding conditions of the cover composition were a screw diameter of 45 mm, a screw rotational speed of 200 rpm, and a screw L/D=35, and the mixture was heated to 160° C. to 230° C. at the die position of the extruder.

When molding the cover, the hold pin was protruded to hold the spherical body having the intermediate layer formed thereon, the cover composition heated to 260° C. was charged for 0.3 second into a mold held under a pressure of 80 tons, and cooled for 30 seconds, and the mold was opened to eject the golf ball. The surface of the obtained golf ball body was treated with sandblast and marked, and a clear paint was applied thereon and dried in an oven at 40° C. to obtain the golf balls having a diameter of 42.7 mm and a mass of 45.4 g.

Evaluation results of the obtained test golf balls are shown in Tables 2 and 3. It can be seen that the golf ball resin composition according to the present invention improves the durability of the golf ball without substantially lowering the resilience of the golf ball, and that the golf ball according to the present invention has excellent resilience and durability.

The golf ball according to the present invention has excellent resilience and durability.

This application is based on Japanese patent application No. 2017-175460 filed on Sep. 13, 2017, the contents of which are hereby incorporated by reference.

The invention claimed is:

1. A golf ball comprising a constituent member formed from a golf ball resin composition, wherein the golf ball resin composition contains a resin component, wherein the resin component consists of (A) an ionomer resin, and (B) an acid modified polypropylene having a weight average molecular weight in a range from 5,000 to 80,000, and the component (A) contains a binary ionomer resin consisting of a metal ion-neutralized product of a binary copolymer composed of an olefin and an α,β-unsaturated carboxylic acid having 3 to 8 carbon atoms, wherein a content of the α,β-unsaturated carboxylic acid component having 3 to 8 carbon atoms in the binary ionomer resin is 16 mass % or more.

2. The golf ball according to claim 1, wherein the golf ball resin composition contains the component (B) in an amount ranging from 0.1 part by mass to 10 parts by mass with respect to 100 parts by mass of the component (A).

3. The golf ball according to claim 1, wherein the component (A) consists of the binary ionomer resin.

4. A golf ball comprising a constituent member formed from a golf ball resin composition, wherein the golf ball resin composition contains a resin component, wherein the resin component consists of (A) an ionomer resin, and (B) an acid modified polyolefin having a weight average molecular weight in a range from 5,000 to 80,000,
wherein the component (A) consists of a binary ionomer resin consisting of a metal ion-neutralized product of a binary copolymer composed of an olefin and an α,β-unsaturated carboxylic acid having 3 to 8 carbon atoms, and
(B) the acid modified polyolefin is a maleic acid modified polyolefin having a maleic acid group introduced into a structure represented by the following formula (I):

(I)

wherein in the formula (I), R is a hydrocarbon group having 2 or more carbon atoms and having a branched structure, and n is an integer of more than 1.

5. The golf ball according to claim 4, wherein the golf ball resin composition contains the component (B) in an amount ranging from 0.1 part by mass to 10 parts by mass with respect to 100 parts by mass of the component (A).

6. A golf ball comprising a constituent member formed from a golf ball resin composition, wherein the golf ball resin composition contains a resin component, wherein the resin component consists of (A) an ionomer resin, and (B) an acid modified polypropylene having a weight average molecular weight in a range from 5,000 to 80,000, and the component (A) consists of a binary ionomer resin consisting of a metal ion-neutralized product of a binary copolymer composed of an olefin and an α,β-unsaturated carboxylic acid having 3 to 8 carbon atoms.

7. The golf ball according to claim 6, wherein the golf ball resin composition contains the component (B) in an amount ranging from 0.1 part by mass to 10 parts by mass with respect to 100 parts by mass of the component (A).

8. A golf ball comprising a constituent member formed from a golf ball resin composition, wherein the golf ball resin composition contains a resin component, wherein the resin component consists of
(A) an ionomer resin, and (B) an acid modified polyolefin having a weight average molecular weight in a range from 5,000 to 80,000,
wherein the component (A) contains a binary ionomer resin consisting of a metal ion-neutralized product of a binary copolymer composed of an olefin and an α,β-unsaturated carboxylic acid having 3 to 8 carbon atoms, wherein a content of the α,β-unsaturated carboxylic acid component having 3 to 8 carbon atoms in the binary ionomer resin is 16 mass % or more, and
(B) the acid modified polyolefin is a maleic acid modified polyolefin having a maleic acid group introduced into a structure represented by the following formula (I):

(I)

wherein in the formula (I), R is a hydrocarbon group having 2 or more carbon atoms and having a branched structure, and n is an integer of more than 1.

9. The golf ball according to claim 8, wherein the golf ball resin composition contains the component (B) in an amount ranging from 0.1 part by mass to 10 parts by mass with respect to 100 parts by mass of the component (A).

10. The golf ball according to claim 8, wherein the component (A) consists of the binary ionomer resin.

11. A golf ball comprising a constituent member formed from a golf ball resin composition, wherein the golf ball resin composition contains a resin component, wherein the resin component consists of (A) a binary ionomer resin consisting of a metal ion-neutralized product of a binary copolymer composed of an olefin and an α,β-unsaturated carboxylic acid having 3 to 8 carbon atoms, and (B) an acid modified polyolefin having a weight average molecular weight in a range from 5,000 to 80,000, and wherein an olefin for forming the polyolefin backbone of (B) the acid modified polyolefin includes an olefin having 3 to 8 carbon atoms.

12. The golf ball according to claim 11, wherein the golf ball resin composition contains the component (B) in an amount ranging from 0.1 part by mass to 10 parts by mass with respect to 100 parts by mass of the component (A).

13. The golf ball according to claim 11, wherein a content of the α,β-unsaturated carboxylic acid component having 3 to 8 carbon atoms in (A) the binary ionomer resin is 16 mass % or more.

14. The golf ball according to claim 11, wherein the golf ball resin composition contains the component (B) in an amount ranging from 0.1 part by mass to 5 parts by mass with respect to 100 parts by mass of the component (A).

15. The golf ball according to claim 11, wherein the golf ball resin composition contains the component (B) in an amount ranging from 0.1 part by mass to 3.3 parts by mass with respect to 100 parts by mass of the component (A).

16. The golf ball according to claim 11, wherein the component (B) has a weight average molecular weight in a range from 32,000 to 80,000.

* * * * *